United States Patent
Kopetz

(10) Patent No.: US 9,454,152 B2
(45) Date of Patent: Sep. 27, 2016

(54) METHOD FOR ALLOCATING CONTROL IN A SYSTEM OF SYSTEMS

(71) Applicant: FTS COMPUTERTECHNIK GMBH, Vienna (AT)

(72) Inventor: Hermann Kopetz, Baden (AT)

(73) Assignee: FTS Computertechnik GmbH, Vienna (AT)

( * ) Notice: Subject to any disclaimer, the term of this patent is extended or adjusted under 35 U.S.C. 154(b) by 0 days.

(21) Appl. No.: 14/776,109

(22) PCT Filed: Mar. 13, 2014

(86) PCT No.: PCT/AT2014/050063
§ 371 (c)(1),
(2) Date: Sep. 14, 2015

(87) PCT Pub. No.: WO2014/138766
PCT Pub. Date: Sep. 18, 2014

(65) Prior Publication Data
US 2016/0026181 A1    Jan. 28, 2016

(30) Foreign Application Priority Data
Mar. 14, 2013    (AT) .................................. A 201/2013

(51) Int. Cl.
*G05D 1/00* (2006.01)
*B60W 50/10* (2012.01)
(Continued)

(52) U.S. Cl.
CPC ............ *G05D 1/0061* (2013.01); *B60W 50/10* (2013.01); *B60W 50/12* (2013.01); *G05D 1/0088* (2013.01);
(Continued)

(58) Field of Classification Search
CPC ............ G05D 1/0061; G05D 1/0088; G05D 2201/0213; B60W 50/10; B60W 50/12; B60W 2050/0006; B60W 2050/0016; B60W 2050/0072; B60W 2050/0095; B60W 2600/00
USPC .......................................................... 701/24
See application file for complete search history.

(56) References Cited

U.S. PATENT DOCUMENTS

| 6,859,927 B2 | 2/2005 | Moody |
| 7,039,551 B2 | 5/2006 | Shu et al. |

(Continued)

FOREIGN PATENT DOCUMENTS

| DE | 10144797 A1 | 3/2003 |
| DE | 102005050310 A1 | 6/2006 |

(Continued)

OTHER PUBLICATIONS

First Office Action dated Nov. 26, 2013 for Austrian Patent Application No. A 201/2013.
(Continued)

*Primary Examiner* — McDieunel Marc
*Assistant Examiner* — James E Stroud
(74) *Attorney, Agent, or Firm* — Sutherland Asbill & Brennan LLP

(57) ABSTRACT

The invention relates to a method for allocating control in a system-of-systems, in particular a dynamic system-of-systems consisting of a physical system PS, an autonomous control system CS, a human operator HO, a monitor component MK and an actuator controller AST, or comprising a physical system PS, an autonomous control system CS, a human operator HO, a monitor component MK and an actuator controller AST, wherein the CS uses a sensor system assigned thereto to cyclically monitor surroundings and/or the physical system itself and creates an internal model of the surroundings and/or the PS on the basis of this monitoring and performs an analysis of this model in order to determine control values for the AST and a criticality index KI of the scenario in a cycle, in particular in the current cycle, and wherein the MK cyclically monitors the HO and/or the actions thereof, in particular the current actions thereof, in order to determine an engagement index EI of the HO in a cycle, in particular in the current cycle, on the basis of this monitoring, and wherein the control over the PS is allocated to the HO when EI>KI.

20 Claims, 1 Drawing Sheet

(51) Int. Cl.
*B60W 50/12* (2012.01)
*B60W 50/00* (2006.01)
(52) U.S. Cl.
CPC ............... *B60W 2050/0006* (2013.01); *B60W 2050/0016* (2013.01); *B60W 2050/0072* (2013.01); *B60W 2050/0095* (2013.01); *B60W 2600/00* (2013.01); *G05D 2201/0213* (2013.01)

(56) References Cited

U.S. PATENT DOCUMENTS

| | | | |
|---|---|---|---|
| 7,124,027 B1 | 10/2006 | Ernst, Jr. et al. | |
| 7,403,988 B1 | 7/2008 | Blouin et al. | |
| 7,647,178 B2 | 1/2010 | Ekmark et al. | |
| 2004/0032334 A1 | 2/2004 | Haq | |
| 2014/0288776 A1* | 9/2014 | Anderson | B60G 17/016 701/37 |
| 2014/0378778 A1* | 12/2014 | Hodges | G06F 19/322 600/301 |
| 2015/0286795 A1* | 10/2015 | Hodges | G06F 19/3437 703/11 |
| 2016/0026181 A1* | 1/2016 | Kopetz | B60W 50/10 701/24 |
| 2016/0033965 A1* | 2/2016 | Kopetz | H04L 12/40182 701/23 |
| 2016/0034363 A1* | 2/2016 | Poledna | G05B 19/0428 714/4.2 |
| 2016/0051702 A1* | 2/2016 | Salhia | A61K 49/0008 800/3 |

FOREIGN PATENT DOCUMENTS

| | | |
|---|---|---|
| DE | 10201009133 A1 | 8/2011 |
| EP | 2314489 A1 | 4/2011 |

OTHER PUBLICATIONS

International Search Report for PCT/AT2014/050063 dated Aug. 13, 2014.

Fisher, D., "An Emergent Perspective on Interoperation in Systems of Systems", Technical Report, Carnegie Mellon Software Engineering Institute, CMU/SEI-2006-TR-003 ESC-TR-2006-003 (Mar. 2006).

Hörwick, M., et al., "Strategy and Architecture of a Safety Concept for Fully Automatic and Autonomous Driving Assistance Systems", pp. 955-960, 2010 IEEE Intelligent Vehicles Symposium (IV), University of California, San Diego, CA, USA (Jun. 21-24, 2010).

Kopetz, H., "Real-Time Systems, Design Principles for Distributed Embedded Applications" 2d Ed., Springer Publishing Company 2011.

Strayer, et al., "Profiles in Driver Distraction: Effects of Cell Phone Conversations on Younger and Older Drivers", Human Factors, vol. 46., No. 4, pp. 640-649, 2004.

* cited by examiner

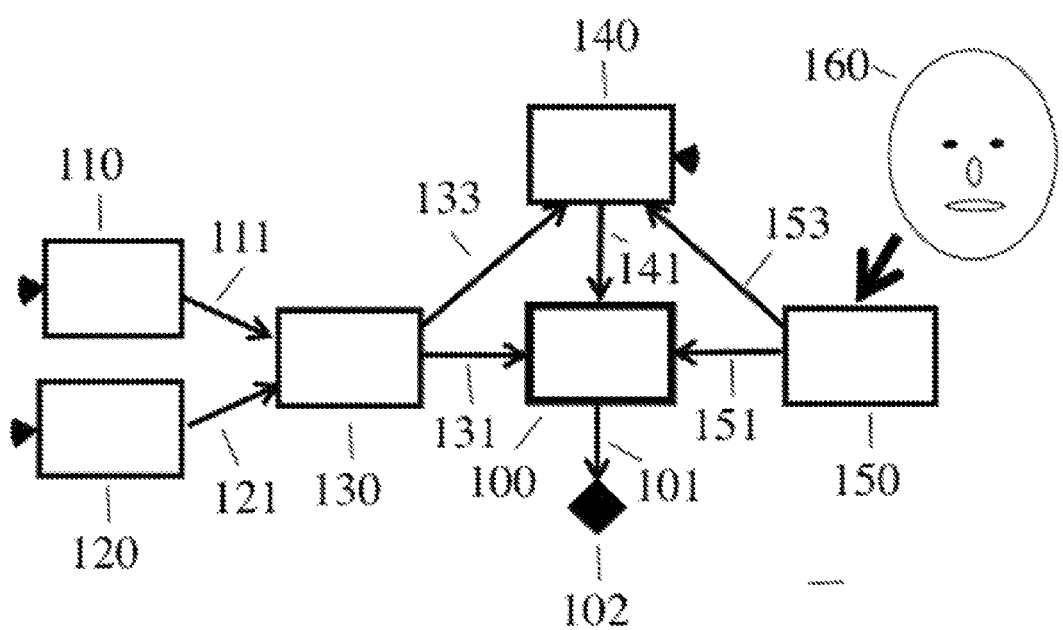

METHOD FOR ALLOCATING CONTROL IN A SYSTEM OF SYSTEMS

The invention relates to a method for allocating control in a system-of-systems, in particular a dynamic system-of-systems, consisting of a physical system PS, an autonomous control system CS, a human operator HO, a monitor component MK and an actuator controller AST, or comprising a physical system PS, an autonomous control system CS, a human operator HO, a monitor component MK and an actuator controller AST.

The invention also relates to a system-of-systems, in particular a dynamic system-of-systems, consisting of a physical system PS, an autonomous control system CS, a human operator HO, a monitor component MK and an actuator controller AST, or comprising a physical system PS, an autonomous control system CS, a human operator HO, a monitor component MK and an actuator controller AST.

The invention also relates to a vehicle, in particular a motor vehicle, comprising a system-of-systems of this type.

The present invention lies in the field of control engineering of autonomous systems. The present invention describes an innovative method for allocating the control over a technical process in a system-of-systems (SoS).

The technical developments in the field of microelectronics enable the economical construction of autonomous technical systems, for example autonomous vehicles, autonomous robots and many others. An autonomous system is characterised in that said system is given an objective, but it is left to the system as to which strategy is selected and followed in order to achieve this objective.

An autonomous technical system consists of a technical installation, the physical object to be controlled (physical system—PS), a computer system (cyber system—CS) controlling the physical object, and an intelligent actuator system (AST), which is arranged at the boundary between the CS and PS, in order to influence the behaviour of the PS. The CS uses its sensor system to monitor the behaviour of the PS and its surroundings and autonomously calculates suitable control values for the AST.

In many fields of application, legislation stipulates that a human must monitor a process performed autonomously and must be capable at any moment in time of intervening in the process. For example, the recently passed laws in the US Federal States of California and Nevada [5] thus require a human to sit at the steering wheel in vehicles having autonomous control systems when on public roads and to be able at any moment to take over the control of the vehicle.

If, besides the CS, a human can also define control values for the AST, two largely independent control systems are then provided in this technical installation: (1) an autonomous CS with sensors (camera, laser, radar, etc.) for monitoring the PS and its surroundings by means of an electronic evaluation logic for determining the control values of the AST, and (2) a human (human operator—HO), who monitors the surroundings using his senses, deliberates suitable control values and defines these control values to the AST. In the specialist English literature, the term system-of-systems (SoS) has become established for a system in which a number of autonomous sub-systems cooperate [6, page 104].

In an SoS a new behaviour or new properties that are not present at sub-system level can be created by the interactions of the autonomous sub-systems. This new behaviour or these new properties are referred to as emergent [7]. Emergent properties may be random or intentional and may act positively or negatively on the mission of the SoS. When two autonomous systems follow different strategies in an SoS in order to achieve a predefined objective, this may lead to random negative emergent properties.

The following example from road traffic is intended to explain the concept of a random negative emergent property of the SoS of an autonomous vehicle. The HO (driver) of a passenger car decides to overtake a heavy goods vehicle on a two-lane road. Immediately before the end of the overtaking manoeuvre, an oncoming vehicle appears (in the same lane as the overtaking passenger car). The automatic braking system of the vehicle identifies the approaching vehicle and initiates an emergency braking in order to avoid an accident. This emergency braking may result in an accident, since the overtaking process cannot be completed by the HO.

The cause of this potential accident lies in the parallel control over the vehicle and the different control strategies followed in this specific case by the two autonomous control systems constituted by the HO and the CS. The HO will wish to accelerate the vehicle further in order to bring the vehicle into the correct lane in time, whereas the CS will wish to brake the vehicle in order to avoid a collision. A significant process that is performed during a limited time shall be referred to as an episode. The overtaking process is an example of an episode. The undesired transfer of control from the HO to the CS during an episode is the reason for the potential accident.

It is hardly possible to exhaustively detect all situations in which random negative emergent properties could occur as a result of the parallel control of the two autonomous control systems—the CS and the HO—over the PS.

An object of the invention is to solve this problem.

This problem is solved with a method of the type described in the introduction in that, in accordance with the invention, the CS uses a sensor system assigned thereto to cyclically monitor surroundings, for example the surroundings of the physical system, and/or the physical system itself and creates an internal model of the surroundings and/or the PS on the basis of this monitoring and performs an analysis of the model in order to determine control values for the AST and a criticality index KI of the scenario in a cycle, in particular in the current cycle, and wherein the MK cyclically monitors the HO and/or the actions thereof, in particular the current actions thereof, in order to determine an engagement index EI of the HO in a cycle, in particular in the current cycle, on the basis of this monitoring, and wherein the control over the PS is allocated to the HO when EI>KI.

This problem is also solved with an SoS of the type mentioned in the introduction in that, in accordance with the invention, in order to allocate the control the CS uses a sensor system assigned thereto to cyclically monitor surroundings, for example the surroundings of the physical system, and/or the physical system itself and creates an internal model of the surroundings and/or the PS on the basis of this monitoring and performs an analysis of the model in order to determine control values for the AST and a criticality index KI of the scenario in a cycle, in particular in the current cycle, and wherein the MK cyclically monitors the HO and/or the actions thereof, in particular the current actions thereof, in order to determine an engagement index EI of the HO in a cycle, in particular in the current cycle, on the basis of this monitoring, and wherein the control over the PS is allocated to the HO when EI>KI.

In accordance with the invention it is thus proposed to regulate the allocation of the control over the PS in principle.

Preferred embodiments of the device according to the invention and of the method according to the invention, which can be provided alone or in any combination with one another, are described hereinafter:

the HO gives control to the CS when $EI \leq EI_{limit}$ and $KI \geq EI$;

the value of the criticality index KI is derived from the time interval between now and the LIA (last instant of action); see also the description of the FIGURES in this respect;

the engagement index EI of the HO is derived from an optical attentiveness index OAI of the HO and a motor attentiveness index MAI of the HO;

the optical attentiveness index OAI of the HO is determined by the monitoring of a line of sight of the HO;

the motor attentiveness index MAI of the HO is determined by the monitoring of the control values output by the HO;

the optical attentiveness index OAI of the HO and the motor attentiveness index MAI of the HO are exponentially smoothed over time.

The following rules are thus proposed for the allocation of the control over the PS:

Only one system (the CS or the HO) may exert control over the PS at any moment in time.

In accordance with legal provisions, the HO may assume control over the PS from the CS at any moment in time.

A transfer of control from the CS to the HO takes place when the engagement of the HO (measured by the engagement index EI) is greater than the criticality of the current situation (measured by the criticality index KI).

In order to prevent an oscillation of the control between the HO and the CS during an episode, a transfer of control from the HO to the CS preferably only takes place when EI is smaller than a defined limit value $EI_{limit}$ and KI is greater than EI.

The invention will be explained in greater detail hereinafter on the basis of the drawing, and in particular it will be described how the KI and EI can be determined. In the searched patent literature [1-3], no method could be found that concerns the allocation of control in an SoS. In the drawing, the sole FIG. 1 shows the structure of a proposed control system.

In many technical fields of application, legislation stipulates that a human must monitor a process performed autonomously and must be capable at any moment in time of intervening in the process. In such an automated technical installation there are two independent control systems: on the one hand the autonomous technical control system with its sensors and on the other hand the human. By means of the parallel control of the control systems, unintentional negative emergent properties may be produced. The present invention discloses a method for allocating the control in order to prevent these negative emergent properties. The method will be explained more precisely on the basis of the example of the control of an autonomous vehicle.

In accordance with FIG. 1 the proposed control system for an autonomous technical installation consists of four blocks. On the left side of FIG. 1 the controlling computer system CS is illustrated. It contains sensors 110 and 120 and a sensor fusion component SFK 130. A preferably intelligent actuator controller AST 100 is shown in the middle. The AST 100 specifies the control values to actuators 102 of a technical installation via a data line 101. On the right side of FIG. 1 the human operator HO 160 with a man/machine interface component MMI 150 is illustrated, and a monitor component MK 140 can be seen in the FIGURE above the AST 100.

Hereinafter, the function of this controller system will be explained on the basis of the example of the controller of an autonomous vehicle. The sensors 110 and 120, for example a camera and a laser sensor, cyclically monitor the surroundings of the vehicle and send the captured data via data lines 111 and 121 to the SFK 130. The duration of a typical cycle is 10 msec by way of example. The SFK 130 creates a three-dimensional model of the surroundings of the vehicle on the basis of the cyclically captured ambient data, calculates the distance from obstacles in the path of travel, and, if the obstacles move, calculates the direction of movement and speed thereof. Following an analysis of a three-dimensional model, the control values for the AST 100 are determined by the SFK 130 under consideration of the speed of the vehicle itself, and these control values are transferred cyclically to the AST 100 via a data line 131.

Within the scope of the analysis of the model the SFK 130 determines critical locations in the three-dimensional space which are of particular significance to the future movement of the vehicle. If, for example, a pedestrian moves in the direction of the carriageway without reducing its speed, the anticipated location where the pedestrian will step onto the carriageway is thus a critical location. A critical location is designated a Point-of-Critical Action (PCA). The SFK determines in the three-dimensional model a sight vector between the eyes of the driver and the PCA and sends the parameters of this sight vector to the MK 140 via a data line 133.

When the identified PCA lies in the intended path of travel of the vehicle, the SFK 130 will thus initiate an action (for example braking process) in order to stop the vehicle before reaching the pedestrian. The latest moment at which an action (for example emergency braking) can be introduced in order to still stop before the obstacle is reached is referred to as the Last Instant of Action (LIA).

The following Tab. 1 specifies the braking distance and the braking time of a passenger car under normal road conditions. The onset time is to be understood to mean the time that passes between the appearance of an obstacle and the onset of braking. The following actions must take place during the onset time:

monitoring of the scenario analysis of the scenario determination of the necessary action onset of the action.

From the literature [8] a typical value for the onset time of the HO 160 is one second, whereas for the CS a value of 100 msec is assumed. The onset distance in Tab. 1 specifies the length of the path covered by the vehicle during the onset time. The braking path BW is the sum of the onset distance and the distance necessary to stop the vehicle following the onset of braking. In the table: AE=onset distance; BW=braking distance; auto=automatically. The following assumptions are made: onset time=manually 1 sec, automatically=0.1 sec.

TABLE 1

Braking distance and braking time [9]

| Speed km/h | AE in m manually | AE in m auto | BW in m manually | BW in m auto | Braking time in s auto |
|---|---|---|---|---|---|
| 30 | 8.3 | .83 | 12.1 | 4.7 | 1.0 |
| 50 | 14 | 1.4 | 24.6 | 12 | 1.6 |
| 80 | 22.2 | 2.2 | 49.6 | 29.6 | 2.6 |
| 100 | 27.8 | 2.8 | 70.7 | 45.6 | 3.2 |
| 130 | 36.1 | 3.6 | 108.6 | 76 | 4.1 |
| 160 | 44.4 | 4.4 | 154 | 114 | 5 |

The remaining response time VRZ is the time between the current, effective time/moment in time (now) and the LIA. The VRZ is a measure for the criticality of the current scenario. The SFK determines from the VRZ, under consideration of the speed of the vehicle and the current driving conditions, a criticality index KI of the current scenario. The standardised KI lies between 0 and 1, wherein 0 represents the lowest criticality and 1 represents the highest criticality.

With reference to Tab. 1 the KI can be determined as follows, by way of example:
when VRZ>4*braking time, then KI=0,
when VRZ braking time, then KI=1, otherwise)
KI=(1−(VRZ−braking time)/(3*braking time))

The KI is transferred cyclically from the SFK 130 via the data line 131 to the AST 100.

The HO 160 in FIG. 1 monitors with his eyes the surroundings of the vehicle, analyses the scenario and provides his control values to the MMI 150 by tactile means. In a motor vehicle the MMI consists fundamentally of the brakes, the steering wheel and the accelerator pedal. In [4] it is proposed by way of example to install a sensor in the steering wheel, which sensor measures the force with which the HO holds the steering wheel. The MMI receives these control values cyclically and forms a vector (current control vector CCV), which includes the control values received from the HO in the current and recently past cycles (for example the recently past cycles are the last 10 cycles). The CCV is transferred cyclically to the AST 100 and to the MK 140.

The MK 140 cyclically captures, by means of a camera, the line of sight of the eyes of the HO 160 (driver) in order to determine whether the HO 160 is monitoring the path of travel and the PCA received from the SFK 130, and determines an optical attentiveness index OAI in the current cycle. The OAI has the value 1 when the optical attentiveness of the HO 160 is evident in the current cycle. If the HO 160 is not looking at the path of travel or has nodded off momentarily, the OAI has the value 0, otherwise a value between 1 and 0. The MK 140 then stores the OAI in a vector in order to form a time series of the OAIs in the immediately past cycles, for example within a second (the onset time of Tab. 1), and calculates from this time series, preferably by means of exponential smoothing, a preferably smoothed, optical attentiveness index $OAI_{smooth}$, wherein the OAI values from the more recent past (for example the last past 10 cycles) are weighted more heavily than the older values.

The MK 140 calculates a preferably smoothed motor attentiveness index $MAI_{smooth}$ in a similar manner in each cycle from the CCV received from the MMI 150, preferably by means of exponential smoothing.

The engagement index EI specifies the extent to which the HO is involved at the current moment in time with the control of the vehicle. EI is a function of $OAI_{smooth}$ and $MAI_{smooth}$. This function will be different in the different traffic situations (town traffic, driving on a motorway). A possible expression of this function is illustrated in Tab.2.

TABLE 2

Engagement index EI as a function of $OAI_{smooth}$ and $MAI_{smooth}$

| | $MAI_{smooth}$ | | | | | |
|---|---|---|---|---|---|---|
| $OAI_{smooth}$ | 0.0 | 0.2 | 0.4 | 0.6 | 0.8 | 1.0 |
| 0.0 | 0.0 | 0.1 | 0.2 | 0.2 | 0.3 | 0.3 |
| 0.2 | 0.0 | 0.1 | 0.2 | 0.3 | 0.4 | 0.4 |
| 0.4 | 0.0 | 0.2 | 0.3 | 0.4 | 0.5 | 0.5 |
| 0.6 | 0.0 | 0.2 | 0.3 | 0.5 | 0.6 | 0.7 |
| 0.8 | 0.0 | 0.2 | 0.4 | 0.5 | 0.7 | 0.9 |
| 1.0 | 0.0 | 0.2 | 0.4 | 0.6 | 0.8 | 1.0 |

The EI is a standardised variable with values between 0 and 1, wherein 0 means that the HO 160 is not engaged and 1 means that the HO 160 is fully engaged. The second column in Tab. 2 ($MAI_{smooth}$=0.0) deals with the case in which the HO 160 is following events attentively to a greater or lesser extent, but is not intervening in the event. The MK 140 transmits the EI cyclically via the data line 141 to the AST 100.

The AST 100 receives, in each cycle, a set of control values for the actuators and the KI of the current scenario from the SFK 130, a further set of control values for the actuators from the MMI 150, and the current EI of the HO 160 from the MK 140.

First the AST must decide who is exerting the control on the actuators in the current cycle: the SFK 130 or the HO 160 (via the MMI 150). If EI>KI, the HO 160 is assuming the control and the AST is receiving the control values from the MMI 150. If EI>$EI_{limit}$ and the HO 160 has exerted control in the past cycle, then the HO 160 also assumes the control in the current cycle. $EI_{limit}$ is a parameter that is introduced in order to prevent an oscillation of the control between the HO 160 and the SFK 130 when an episode with high engagement of the HO 160 occurs. When EI $EI_{limit}$ and KI≥EI, then the SFK 130 assumes the control. The AST 100 subsequently transfers the selected control values to the actuators 102.

An exemplary value for $EI_{limit}$ is 0.7.

By means of a clear allocation of the control, the occurrence of random negative emergent properties can be prevented in an SoS, and the safety of the system can be increased. The present invention is therefore of great economical and social importance.

The described method for allocating control in an SoS can be applied not only to autonomous vehicles, but also to a multiplicity of other autonomous devices, for example the control of robots.

CITED LITERATURE

[1] U.S. Pat. No. 7,124,027. Vehicular Collision Avoidance System. Granted Oct. 17, 2006
[2] U.S. Pat. No. 7,647,178. Ekmark, et al. Method and system for forward collision avoidance in an automotive vehicle, granted Jan. 12, 2010
[3] U.S. Pat. No. 7,039,551. Shu et al., Method and Apparatus for Calculating an Operator Distraction Level. Granted May 2, 2006.
[4] US Patent Application 200432334. Kind, C. Doze-off early Warning System for Automotive and other Applications. US Patent Application 200432334. Feb. 19, 2004.

[5] Wikipedia, *Autonomous Cars*. URL: http://en.wikipedia.org/wiki/Autonomous car
[6] Kopetz, H. *Real-Time Systems, Design Principles for Distributed Embedded Applications*. Springer Publishing Company 2011.
[7] Fisher, D., *An Emergent Perspective on Interoperation of Systems of Systems*. TECHNICAL REPORT CMU/SEI-2006-TR-003 ESC-TR-2006-003
[8] Strayer, D. L. et al. *Profiles in Driver Distraction: Effects of Cell Phone Conversations on Younger and Older Drivers*. Human Factors. Vol. 46. No. 4, pp. 640-649. 2004
[9] Autokiste., *Brake distance calculator*, accessed on Jan. 13, 2013 at URL: http//www.autokiste.de/service/anhalteweg/index.htm

The invention claimed is:

1. A method for allocating control in a dynamic system-of-systems or other system-of-systems consisting of a physical system (PS), an autonomous control system CS, an operator (160), a monitor component (MK) (140) and an actuator controller AST (100), wherein the CS comprises a first memory apparatus coupled to a first processor, and wherein the MK comprises a second memory apparatus coupled to a second processor, the method comprising:
   the CS using a sensor system (110, 120) assigned thereto to cyclically monitor surroundings and/or the physical system and creates an internal model of the surroundings and/or the PS on the basis of this monitoring and performing analysis of this model, by the first processor, to determine control values for the AST (100) and a criticality index (KI) of the scenario in a cycle, and
   the MK (140) cyclically monitoring the (160) and/or actions thereof, to determine, by the second processor, an engagement index EI of the operator (160) in the cycle, on the basis of this monitoring, wherein EI and KI may adopt standardised values between 0 and 1, wherein KI=0 represents the lowest criticality and KI=1 represents the highest criticality, and wherein EI=0 indicates that the operator (160) is not engaged, and EI=1 indicates that the operator (160) is fully engaged, and wherein the control over the PS is allocated to the operator (160) when EI>KI.

2. The method of claim 1, wherein the operator (160) gives control to the CS when $EI \leq EI_{limit}$ and $KI \geq EI$.

3. The method of claim 1, wherein the value of the criticality index KI is derived, by the first processor, from the interval between now and the LIA (last instant of action).

4. The method of claim 1, wherein the engagement index EI of the operator (160) is derived, by the second processor, from an optical attentiveness index (OAI) of the operator (160) and a motor attentiveness index MAI of the operator (160).

5. The method of claim 4, wherein the optical attentiveness index (OAI) of the operator (160) is determined by the monitoring of a line of sight of the operator (160).

6. The method of claim 4, wherein the motor attentiveness index (MAI) of the operator (160) is determined by the monitoring of the control values output by the operator (160).

7. The method of claim 4, wherein the optical attentiveness index (OAI) of the operator (160) and the motor attentiveness index (MAI) of the operator (160) are exponentially smoothed over time.

8. A dynamic system-of-systems or other systems-of-systems consisting of:
   a physical system (PS);
   an autonomous control system (CS) comprising a first memory apparatus coupled to a first processor;
   an operator (160);
   a monitor component (MK) (140) comprising a second memory apparatus coupled to a second processor; and
   an actuator controller (AST) (100),
   wherein in order to allocate the control the CS uses a sensor system (110, 120) assigned thereto to cyclically monitor and create an internal model of the surroundings and/or the PS on the basis of the monitoring and performs, by the first processor, analysis of this model to determine control values for the AST (100) and a criticality index (KI) of the scenario in a cycle, and
   wherein the MK cyclically monitors the operator (160) and/or actions thereof, to determine, by the second processor, an engagement index (EI) of the operator (160) in the cycle, on the basis of this monitoring, wherein EI and KI may adopt standardised values between 0 and 1, wherein KI=0 represents the lowest criticality and KI=1 represents the highest criticality, and wherein EI=0 indicates that the operator (160) is not engaged, and EI=1 indicates that the operator (160) is fully engaged, and wherein the control over the PS is allocated to the operator (160) when EI>KI.

9. The system-of-systems of claim 8, wherein the HO (160) gives control to the CS when $EI \leq EI_{limit}$ and $KI \geq EI$.

10. A motor vehicle or other vehicle, comprising at least one of the systems-of-systems of claim 8.

11. The method of claim 1, wherein the sensor system (110, 120) assigned to the CS cyclically monitors surroundings of the physical system.

12. A method for allocating control in a dynamic system-of-systems or other system-of-systems which comprises a physical system (PS), an autonomous control system (CS), an operator operator (160), a monitor component (MK) (140) and an actuator controller (AST) (100), wherein the CS comprises a first memory apparatus coupled to a first processor, and wherein the MK comprises a second memory apparatus coupled to a second processor, the method comprising:
   the CS using a sensor system (110, 120) assigned thereto to cyclically monitor surroundings and/or the physical system and creates an internal model of the surroundings and/or the PS on the basis of this monitoring and performing analysis of this model, by the first processor, to determine control values for the AST (100) and a criticality index KI of the scenario in a cycle, and
   the MK (140) cyclically monitors the operator (160) and/or actions thereof, to determine, by the second processor, an engagement index EI of the operator (160) in the cycle, on the basis of this monitoring, wherein EI and KI may adopt standardised values between 0 and 1, wherein KI=0 represents the lowest criticality and KI=1 represents the highest criticality, and wherein EI=0 indicates that the operator (160) is not engaged, and EI=1 indicates that the operator (160) is fully engaged, and wherein the control over the PS is allocated to the operator (160) when EI>KI.

13. The method of claim 12, wherein the sensor system (110, 120) assigned to the CS cyclically monitors surroundings of the physical system.

14. A dynamic or other system-of-systems comprising:
   a physical system (PS);
   an autonomous control system (CS) comprising a first memory apparatus coupled to a first processor;

a monitor component (MK) (140) comprising a second memory apparatus coupled to a second processor; and an actuator controller (AST) (100), wherein in order to allocate the control the CS uses a sensor system (110, 120) assigned thereto to cyclically monitor and create an internal model of the surroundings and/or the PS on the basis of the monitoring and performs, by the first processor, analysis of this model to determine control values for the AST (100) and a criticality index KI of the scenario in a cycle, and wherein the MK cyclically monitors an operator operator (160) and/or actions thereof, to determine, by the second processor, an engagement index (EI) of the operator (160) in the cycle, on the basis of this monitoring, wherein EI and KI may adopt standardised values between 0 and 1, wherein KI=0 represents the lowest criticality and KI=1 represents the highest criticality, and wherein EI=0 indicates that the operator (160) is not engaged, and EI=1 indicates that the operator (160) is fully engaged, and wherein the control over the PS is allocated to the operator (160) when EI>KI.

15. The system-of-systems of claim 14, wherein the operator (160) gives control to the CS when EI≤EI$_{limit}$ and KI≥EI.

16. A motor vehicle or other vehicle comprising at least one of the systems-of-systems of claim 14.

17. At least one non-transitory computer-readable medium comprising computer-executable instructions that upon execution by at least one processor configure the at least one processor to perform operations comprising:

receiving, from a sensor system configured to clinically monitor at least one of a physical system PS or surroundings, sensor data;

creating, by the at least one processor, an internal model of at least one of the PS or the surroundings based on the sensor data;

performing analysis on the internal model;

determining control values for an actuator controller (AST) and a criticality index (KI) of a scenario in a cycle based at least in part on the analysis;

receiving, from a monitor component (MK) configured to clinically monitor actions of an operator, data indicative of one or more actions;

determining an engagement index EI of the operator in the cycle based on the data indicative of the one or more actions, wherein the control over the PS is allocated to the operator in response to determining that EI>KI.

18. The at least one non-transitory computer-readable medium of claim 17, wherein values for EI and KI are between 0 and 1, wherein KI having a value of zero is indicative of a lowest criticality and KI having a value of 1 is indicative of the highest criticality, and wherein EI having a value of 0 is indicative of that the operator being not engaged, and EI having a value of 1 is indicative of the operator being fully engaged.

19. The at least one non-transitory computer-readable medium of claim 17, wherein the cycle is a current cycle and wherein the EI is indicative of engagement of the operator in a current cycle.

20. The method of claim 1, wherein the cycle is a current cycle and wherein the EI is indicative of engagement of the operator in a current cycle.

* * * * *

UNITED STATES PATENT AND TRADEMARK OFFICE
CERTIFICATE OF CORRECTION

PATENT NO. : 9,454,152 B2
APPLICATION NO. : 14/776109
DATED : September 27, 2016
INVENTOR(S) : Hermann Kopetz Page 1 of 1

It is certified that error appears in the above-identified patent and that said Letters Patent is hereby corrected as shown below:

In the Claims

Column 7, line 34 (claim 1, line 17), please change "the (160)" to -- the operator (160) --

Column 8, line 27 (claim 9, line 1), please change "the HO" to -- the operator --

Column 8, line 37 (claim 12, line 4), please change "operator operator" to -- operator --

Column 9, line 11 (claim 14, line 15), please change "operator operator" to -- operator --

Signed and Sealed this
Twentieth Day of December, 2016

Michelle K. Lee
*Director of the United States Patent and Trademark Office*